United States Patent [19]

Donner et al.

[11] Patent Number: 4,507,963

[45] Date of Patent: Apr. 2, 1985

[54] TACHOGRAPH COVER DOOR ASSEMBLY

[75] Inventors: Bernd Donner, Villingen-Schwenningen; Roland Siefert, Bad Dürrheim, both of Fed. Rep. of Germany

[73] Assignee: Kienzle Apparate GmbH, Villingen, Fed. Rep. of Germany

[21] Appl. No.: 435,557

[22] Filed: Oct. 21, 1982

[30] Foreign Application Priority Data

Oct. 28, 1981 [DE] Fed. Rep. of Germany ....... 3142677

[51] Int. Cl.[3] ..................... G01D 11/24; G01D 15/00; E05D 7/00; E05D 11/10

[52] U.S. Cl. ..................................... 73/431; 346/145; 16/224; 16/319

[58] Field of Search .................. 346/145; 16/345-348, 16/358-360, 374, 224-230, 319; 73/431

[56] References Cited

U.S. PATENT DOCUMENTS 2,554,333 5/1951 Kaplowitz .......................... 95/31 X
3,463,109 8/1969 Weiler .............................. 16/224 X
4,423,631 1/1984 Dold ................................ 73/431 X

FOREIGN PATENT DOCUMENTS 1137228 9/1962 Fed. Rep. of Germany ........ 73/431

*Primary Examiner*—E. A. Goldberg
*Assistant Examiner*—Gerald E. Preston
*Attorney, Agent, or Firm*—Toren, McGeady and Stanger

[57] ABSTRACT

A tachograph assembly including a casing and a cover member pivotally mounted on the casing with a first pivotal bearing member being formed on a first part of the cover member and a second pivotal bearing member being formed on a casing extension which, together with the cover member, forms the front face of the tachograph assembly in a generally common plane. The second bearing member has an outer radius which corresponds to the inner radius of the first bearing member and a bearing spindle in the form of an elongated lip is formed on the second part of the cover member for engagement with the second bearing member to enable pivotal motion of the cover member relative to the casing. The first part of the cover member includes alignment elements which operate in cooperation with corresponding elements in the casing to align the cover member within the casing when the cover is in the closed position.

4 Claims, 8 Drawing Figures

FIG. 6
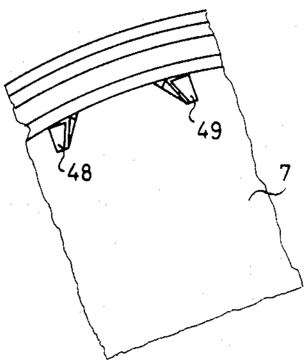
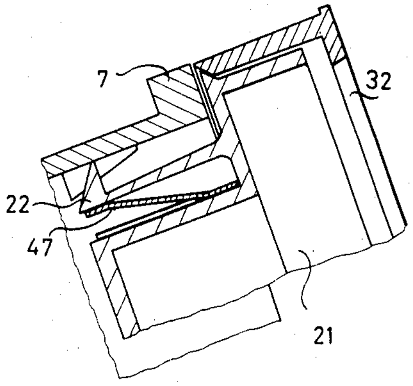
FIG. 5
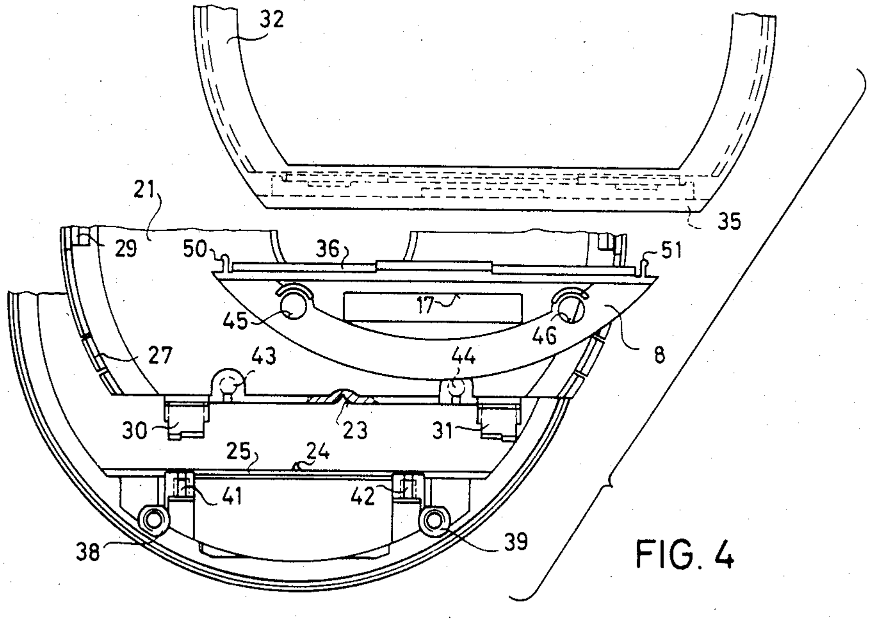
FIG. 4

TACHOGRAPH COVER DOOR ASSEMBLY

The present invention relates generally to recording instruments and more particularly to a tachograph which is formed with a casing and a cover member pivotally supported at the casing. The tachograph includes recording elements which are arranged both in the casing and in the cover and which are brought into cooperative connection with each other when the cover is in the closed position. Tachographs of the type to which the present invention relates usually involve centering elements which are constructed in operative engagement between the cover and the casing to permit the cover to be appropriately centered within the casing when in the closed position and, in such devices, provision may be made to adapt the cover support to the centered position in the casing.

Tachographs of the type to which the invention relates may be used in motor vehicles and, in accordance with the present technology, recording discs in such tachographs which serve as the recording medium are provided in the pivotal cover of the tachograph in such a manner that the recording discs face the observer when the cover is in the open position in all installation situations applicable to the tachograph. This means that receiving, engaging, and driving elements for the recording discs are arranged in the cover and that parts of the cover serve as support and guide means for the recording discs while usually the remaining recording elements, their driving means as well as corresponding measuring devices are installed in the casing of the tachograph.

However, it has been found that arrangements of this type will not ensure trouble-free handling of the tachograph during random sampling processes of the recordings and during exchange of the recording discs. On the other hand, however, due to the relatively limited transport speed of the recording medium, the line density of the speed diagrams being in any case in the boundary range of solubility, it is particularly necessary in view of the need for a reliable accident evaluation that provision be made for exact centering of the cover and the casing. This is a requirement since the recording discs upon which information is recorded in a given tachograph do not show a constant recording characteristic, but may involve time shift of the recordings during opening of the tachograph, for example in order to check recorded data by customs or police officials.

Due to this requirement, support of the cover at the casing is quite important, particularly since the cover also carries different operating instruments and indicators and consequently may not only involve a substantial structural size but also considerable weight.

Under the circumstances, it is desirable to provide a tachograph construction wherein accurate placement and alignment of the cover member may be effected in an arrangement which is not unduly complex and overly expensive. Devices wherein centering means are not utilized and which provide a cover support requiring close tolerances and difficult operating manipulation tend to be disadvantageous from the point of view of mass production due to the required manufacturing accuracy and due to the complex assembly and adjustment procedures which are involved during manufacture, not to mention problems of wear which may occur during use. However, if centering means are utilized, for example in such a manner as to provide a centering rim at the cover and a corresponding recess in the casing, or in a manner whereby a projection is provided at the cover which engages into a suitable recess in the casing when the cover is closed, then if proper tolerances are not maintained, problems may occur due to dimensional factors. Again, difficult manufacturing techniques may be involved which detract from suitability of the device for mass production, for example in structures where, in the seat of a hinge spindle, the cover and the casing must be drilled together. On the other hand, there occurs the danger that if the support for the cover does provide sufficient play so that the cover may center at the casing during closing, there arises the danger that when the tachograph is to be opened, the cover may slide and strike against an object whereby damage would be caused to the assembly.

An attempted solution in the prior art is shown in German Pat. No. 1 137 228 wherein between the bearing elements constructed as part of the casing and a hinge spindle attached at the cover member, there is provided sufficient radial play that centering of the cover in the casing remains unaffected by the support of the cover. In this device, the disadvantage of play between the cover and the casing is compensated by means of a braking device arranged on the hinge spindle and consisting of cam plates and cam springs which are effective in the axial direction during opening of the cover.

However, such an arrangement does not totally avoid the danger that when the cover is moved downwardly on its support means, it may become damaged and may thus not permit exact centering of the cover during closing. Also, there is required additionally increased numbers of parts and consequently increased complexity in the assembly procedures wherein tight tolerances are required. Particularly in view of the arrangement of the seat of the hinge spindle, due to the axial thrust the hinge spindle is inclined to move axially in a manner which is undesirable and should be prevented.

Therefore, the present invention is directed toward providing a tachograph structure of the type described which will permit easy assembly of the cover and the casing in such a manner that first the cover and the casing may be centered relative to one another and so that subsequently support of the cover at its centered position in the casing may be easily achieved.

SUMMARY OF THE INVENTION

Briefly, the present invention may be described as a tachograph assembly comprising casing means, a cover member pivotally supported on said casing means for movement between an open and a closed position and operative recording means physically located in both said casing means and said cover member arranged to be placed in cooperative connection when said cover member is in the closed position. The cover member is formed with two parts, the first part being adapted to engage the casing means to effect centering of the cover member relative to the casing means and the second part being connected to the first part. A casing extension is connected with the casing means and together with the second part of the cover member forms the front surface of the tachograph assembly lying in a common plane. First pivotal bearing means are formed on the first part of the cover member and second pivotal bearing means are formed on the casing extension, with the second bearing means having an outer radius corresponding to the inner radius of the first bearing means.

In order to mount the cover member for pivotal movement relative to the casing means, the second part of the cover member is formed with bearing spindle means comprising a lip member which is arranged to operatively engage the second pivotal bearing means for enabling pivoting of the cover member relative to the casing means.

As a result of the construction of the present invention, the first part of the cover member can be centered relative to the casing and at least one pivotal bearing member is provided on the first part of the cover with this bearing member being in cooperative association with the second pivotal bearing means which is constructed at a part which forms the casing extension and can be connected with the casing. The outer radius of the second bearing means corresponds to the inner radius of the first bearing means on the side of the cover and, at a second part of the cover which can be connected with the first part which operates to center the cover relative to the casing, the lip is formed which constitutes the bearing spindle means and which engages the second pivotal means formed on the casing extension. This serves as the bearing spindle for the cover member.

In accordance with a preferred embodiment of the invention, the front surface of the cover member and the front surface of the casing extension are arranged to lie essentially in a common plane so that together they will form the front surface of the tachograph assembly. As a result, a separating line therebetween is formed which extends across the face of the tachograph. The second pivotal bearing means constructed on the casing extension and the lip member forming the bearing spindle means provided at the cover member are essentially constructed with a length equal to the length of the separating line between the front surfaces of the cover member and the casing extension. The first part of the cover member which operates to center the cover member relative to the casing means is formed with two relatively small bearing member which are spaced apart and which engage the second pivotal bearing means formed on the casing extension.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

DESCRIPTION OF THE DRAWINGS

In the drawings:

FIG. 4 is an exploded perspective front view showing parts of the assembly;

FIG. 5 is a detailed sectional view showing alignment elements which interact with centering elements provided between the casing means and the cover member;

FIG. 6 is a front view showing guide means formed in the casing adapted to cooperate with the alignment element shown in FIG. 5 in order to guide the cover member relative to the casing;

DETAILED DESCRIPTION OF THE PREFERRED EMBODIMENT

Figure 1:
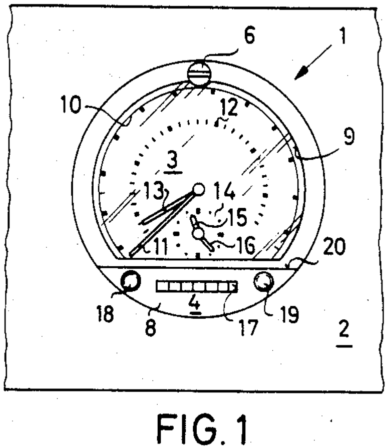
FIG. 1 is a front view of a tachograph assembly in accordance with the present invention shown as installed in the dashboard of a vehicle.
Figure 2:
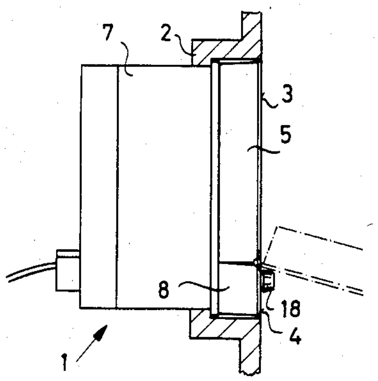
FIG. 2 is a sectional side view showing the installation of FIG. 1.

FIGS. 1 and 2 depict the overall tachograph assembly wherein there is provided a tachograph 1 installed flush in a dashboard 2, with the tachograph assembly having front surfaces 3 and 4 which lie in a common plane with the front surface of the dashboard 2. The assembly includes a pivoted cover member 5 and a casing 7 upon which the cover 5 is mounted, with the cover 5 being locked in the closed position relative to the casing by locking means 6.

A casing extension 8 is provided which may be detachably connected with the casing 7, for example, by means of screw connections which will be further described hereinafter. It is also noted that a window 9 is provided in the cover 5 through which there may be viewed speed indicators and revolution indicators 10, 11 and 12, 13, as well as indicators 14, 15, and 16 which display time data. A window 17 is provided on the casing extension 8 which serves to enable viewing of a distance counter. Setting knobs 18 and 19 operate to enable preselection of the type of working time recording and the front surface 3 of the cover member 5 and the front surface 4 of the casing extension 8 are separated by a line 20 along which the cover 5 pivots relative to the casing extension 8. The pivoted or open position of the cover 5 is shown in FIG. 2 in dotted line form.

Figure 3:
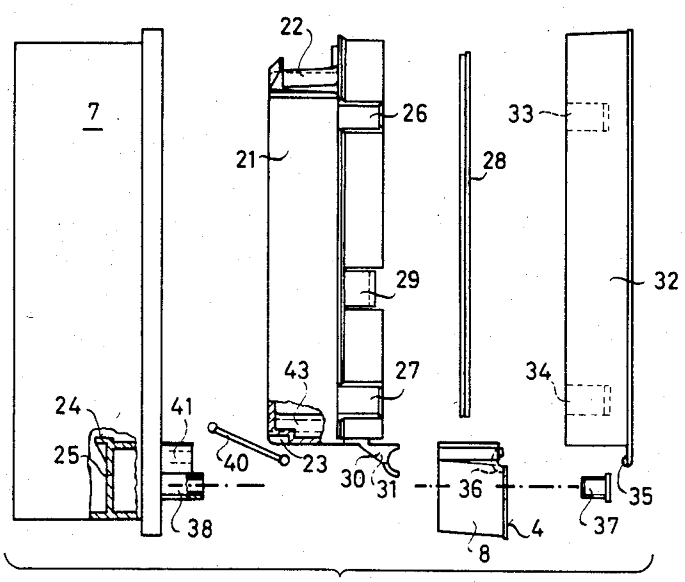
FIG. 3 is an exploded side view showing the individual parts of the tachograph assembly.

In FIG. 3 there are shown in side view the individual parts comprising the cover member 5 and the casing means 7, with FIG. 3 being arranged to indicate the assembly sequence of the tachograph assembly. The cover member 5 is formed to include a first part 21 which is essentially formed with a cup-shaped configuration having on the upper side thereof an alignment element 22 which comprises a pawl member with a notch 23 being formed on the opposite lower side of the first part 21.

The casing 7 is formed with an edge 24 provided at an intermediate wall 25 which is arranged to cooperate with the notch 23. The first part 21 of the cover member 5 is also formed with several pawls of which two pawls 26 and 27 are visible in FIG. 3, and brackets 29 which serve to support a scale indicia member 28, with only one of the brackets 29 being shown in FIG. 3. The first part 21 of the cover member 5 also includes first pivotal bearing means which comprise two pivotal bearing member 30 and 31 which are formed by injection molding.

The cover member 5 also comprises a second part upon which there is formed a front ring 32 of the tachograph assembly. Recesses 33 and 34 are constructed in the second part of the cover member 5 within which the pawls 26 and 27 engage. Additionally, at the front ring 32 there is formed an essentially cylindrically shaped lip member 35 having a radius which corresponds to the inner radius of a cylindrical pivotal bearing member 36 which is constructed on the casing extension 8 and which comprises second pivotal bearing means. The outer radius of the bearing member 36 is equivalent to the inner radius of the bearing member 30 and 31 which are located in the first part 21 of the cover member 5. FIG. 3 shows one of at least two screws 37 which operate to detachably connect the casing extension 8 with the casing member 7, the casing member 7 being formed with suitable threaded lugs 38 and 39 within which the screws 37 may engage, the casing extension 8 having corresponding threaded bores 45 and 46. Additionally, in FIG. 3, one of two retaining bars 40 is shown which has spherical ends supported or guided in a pivotal manner at one side always at one bearing point 41 or 42 which is constructed at the casing member 7. The other side of the retaining bars 40 engages in gates 43 and 44 which are formed in the cover member 5.

FIGS. 5 and 6 show in greater detail the alignment pawl 22 and a spring 47 as well as guide ribs 48 and 49 which are formed in the casing member 7. When the cover is brought into the closed position, the spring 47 will operate to exercise an alignment force which will act to cause the notch 23 to engage with the edge 47 located in the casing 7 in order thereby to secure the cover member 5 in the casing 7 relative to a first direction of movement. Another fixation of the cover 5 transversely to this first direction which is effected by the connection between the notch 23 and the edge 24 occurs by means of the alignment element 22 which engages between the guide ribs 48 and 49. Accordingly, with the alignment means described, exact centering of the cup-shaped first part 21 of the cover member 5 in the casing 7 will occur with the centering or alignment being such that it does not depend upon the support means of the assembly. It should also be mentioned that at the casing extension 8 there are provided elastic lugs 50 and 51 which serve for affixing the casing extension 8 during its assembly as well as to cover the gap between the cover and the casing extension.

Figure 7:
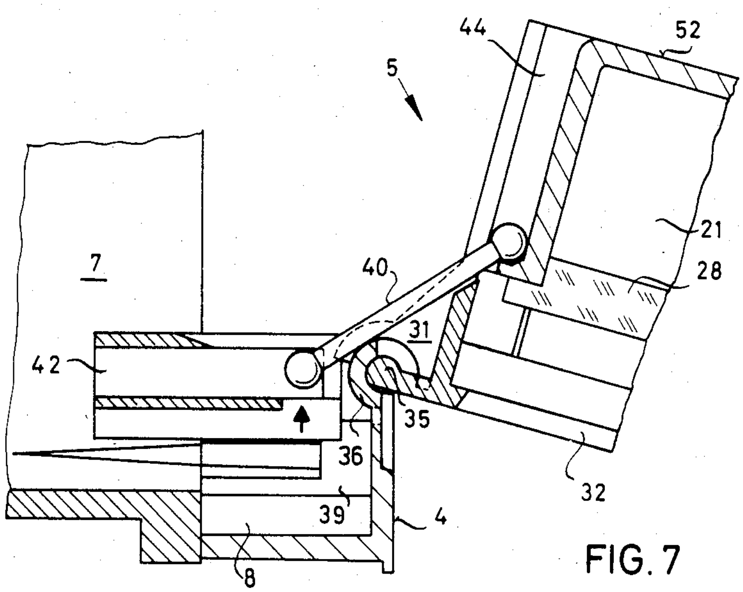
FIG. 7 is a sectional side view showing the cover member in the open position.

Referring to FIGS. 3 and 4, in the assembly procedure for connecting the cover member 5 and the casing 7, the retaining bars 40 are inserted into the gates 43 and 44 first and the free ball ends of the retaining bars 40 are locked into their seats in the casing 7 as indicated by the arrow in FIG. 7. Then, the first part 21 of the cover member 5, in which various functional elements have already been preassembled, is placed onto the casing 7 where, as already described, an automatic centering operation takes place by means of the alignment means described above. The next step is to place the casing extension 8 in the assembly and to do so it is aligned in accordance with the position of the bearing members 30 and 31 which are formed on the first part 21 and it is attached by means of screws 37. Subsequently, after the indicating elements which are to be arranged in the cover 5 have been completed, the front ring 32 is secured onto the first part 21 of the cover 5 and the lip 35 engages in the bearing member 36 whereby the support of the cover 5 at the casing 7 is complete. FIG. 3 shows by way of an example an indicator, the front disc as well as the clamping or sealing ring which is assigned to the front disc which represents the scale indicia carrier 28.

As a result of the construction described above, a firm and secure positioning and locking of the parts occurs by operation of the bearing elements which are in operative connection and, except for the retaining bars 40, no additional bearing parts need be manufactured and assembled. In order to absorb bearing play which is caused by the tolerances involved, the bearing members in the first part 21 of the cover member 5 may be formed of elastic material. Additionally, the axis of the bearing members 30 and 31 is arranged to be offset as compared with the bearing spindle by an amount such that the bearing members 30 and 31 will engage elastically around the bearing members 36. It is also desirable that in the area of the operatively connected bearing elements 30, 31, 35, and 36 opposed ribbings are provided with which axial safety may be effected as well as optimization of the engagement angle of the bearing elements. It should be added that in the assembly of the bearing elements in accordance with the invention, automatic adaptation or alignment of the precentered first part 21 of the cover member 5 is possible and that only after the bearing has been formed is a firm connection of the casing extension 8 with the casing undertaken.

Figure 8:
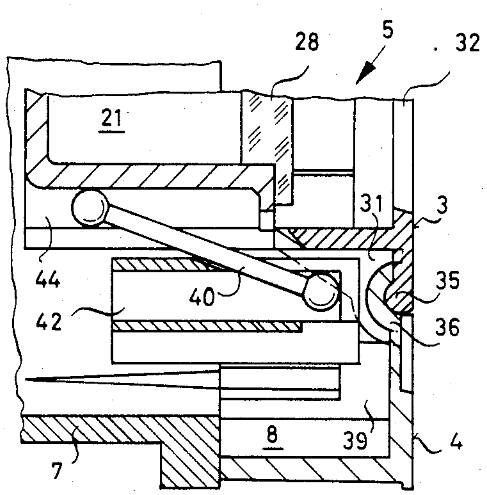
FIG. 8 is a sectional side view showing the cover member in the closed position.

The construction and function of the cover member 5 and the casing 7 may best be understood by reference to the enlarged sectional representations of FIGS. 7 and 8.

FIG. 7 shows the tachograph assembly with the cover 5 in the open position. It will be seen that the front ring 32 forms essentially a recording disc guide surface or recording support and that the cover 5, so to speak, hangs from one side at the retaining bars 40 which are provided to limit the pivoting angle of the cover 5. On the other side, the cover 5 is supported by means of the lip 35 which is constructed at one side of the front ring 32 and which engages within the bearing member 36 to form the bearing spindle means for the cover 5. At the same time, the bearing member 36 which, as previously described, is installed at the casing extension 8 which is connected with the casing 7 is engaged by the bearing members 30 and 31 which are also associated with the cover 5 so that the cover 5 is held at the casing extension 8.

In the representation of FIG. 8, the cover 5 is shown in the closed position and there is depicted clearly the limited space requirements of the bearing means, the sealing function which must be provided as well as the flat construction of the front surface 3 of the cover which is enabled by the arrangement and juxtaposition of the front surface 3 and the front surface 4 of the casing extension. It will also be evident that even in the completely assembled condition, the cover 5, due to the alignment of the casing extension 8, may operate to provide adaptation or readjustment of the bearing to the position of the cover 5 which may be performed in its closed position.

It will be found that an advantage of the present invention arises inasmuch as the lip 35 may be constructed at the front ring 32 which can be locked with the first part 21 of the cover 5 with the first part 21 operating to effect centering with the casing.

The decisive advantage provided by the present invention lies in the structural arrangement whereby the cover 5 is supported which operates without requiring subsequent procedures so that the cover may be aligned without play without requiring any special alignment steps. The first cover part 21 operates to accurately align the cover member 5 with the casing merely by means of the alignment elements which are provided and the positioning of the casing extension relative to the casing operates to assure proper cover alignment.

It is also advantageous that the bearing elements are constructed directly at the parts which are in operative connection with one another and that the support of the cover can be simply completed by means of a cover part which is required in any case, i.e., the front rim. This means that the invention is particularly suitable for mass production because no additional elements and assembly procedures, such as drilling and pinning, are necessary and since also subsequent conversion or exchange of parts is possible.

Of course, with the construction in accordance with the present invention, the pivoting gap which would normally exist between the casing and the cover is transferred to the front surface of the tachograph assembly and as a result a certain lessening in the aesthetic appearance of the front surface occurs. However, on the other hand, flush installation of the tachograph in the dashboard of a vehicle is possible and the support means which are provided for the cover operates to necessitate only a minimal pivoting gap which serves merely for rolling motion between the lip member 35 and the bearing member 36 installed in the casing extension. Consequently, even without the use of additional sealing means, an adequate sealing action may be achieved when the device is closed. This sealing action is also maintained relative to dust when the cover is open. Additionally, the subject matter of the invention may be utilized in tachographs with cylindrical as well as with square casings. Also, the selected support of the cover permits, with an extremely small space requirement, the construction of a largely flat front surface.

While a specific embodiment of the invention has been shown and described in detail to illustrate the application of the inventive principles, it will be understood that the invention may be embodied otherwise without departing from such principles.

What is claimed is:

1. A tachograph assembly comprising: casing means; a cover member pivotally supported on said casing means for movement between an open and a closed position, said cover member comprising a first part adapted to engage said casing means to effect centering of said cover member relative to said casing means and a second part which is connected to said first part; operative recording means physically located in both said casing means and said cover member arranged to be placed in cooperative connection when said cover member is in the closed position; a casing extension connected with said casing means; first pivotal bearing means formed on said first part of said cover member; second pivotal bearing means formed on said casing extension; said second pivotal bearing means having an outer radius corresponding to the inner radius of said first pivotal bearing means; and bearing spindle means formed on said second part of said cover member cooperatively engaging said second pivotal bearing means for enabling pivotal motion of said cover member relative to said casing means; said first and said second pivotal bearing means being adapted to be placed in cooperative relationship with each other prior to placement of said second part of said cover member in said assembly.

2. A tachograph assembly according to claim 1 wherein said cover member and said casing extension are each formed with front surfaces which lie essentially in a common plane and which together form the front surface of said tachograph assembly when said cover member is in the closed position, said second pivotal bearing means and said bearing spindle means being formed of a length generally coextensive with the separating line lying in said common plane between said cover member and said casing extension.

3. A tachograph assembly according to claim 1 wherein said first pivotal bearing means are formed of a pair of relatively small bearing members spaced apart on said first part of said cover member which engage said second pivotal bearing means on said casing extension.

4. A tachograph assembly according to claim 1 wherein said second part of said cover member includes a front ring member, wherein said bearing spindle means comprise a lip member formed on said front ring member and pivotally engaged within said second pivotal bearing means, and wherein said front ring member is adapted to be securely fastened with said first part of said cover member in the assembled condition.

* * * * *